United States Patent
Holtzman et al.

(10) Patent No.: US 8,423,794 B2
(45) Date of Patent: Apr. 16, 2013

(54) METHOD AND APPARATUS FOR UPGRADING A MEMORY CARD THAT HAS SECURITY MECHANISMS FOR PREVENTING COPYING OF SECURE CONTENT AND APPLICATIONS

(75) Inventors: Michael Holtzman, Cupertino, CA (US); Fabrice Jogand-Coulomb, San Carlos, CA (US)

(73) Assignee: SanDisk Technologies Inc., Plano, TX (US)

( * ) Notice: Subject to any disclaimer, the term of this patent is extended or adjusted under 35 U.S.C. 154(b) by 1234 days.

(21) Appl. No.: 11/765,583

(22) Filed: Jun. 20, 2007

(65) Prior Publication Data

US 2008/0162947 A1    Jul. 3, 2008

Related U.S. Application Data

(60) Provisional application No. 60/882,268, filed on Dec. 28, 2006.

(51) Int. Cl.
G06F 21/00    (2006.01)

(52) U.S. Cl.
USPC ............. 713/193; 726/4; 726/28; 713/189; 380/259; 380/283; 455/410; 705/44; 709/227

(58) Field of Classification Search ............ 713/193
See application file for complete search history.

(56) References Cited

U.S. PATENT DOCUMENTS

| | | | |
|---|---|---|---|
| 4,549,896 A | 10/1985 | Streicher et al. | 65/135 |
| 4,590,552 A | 5/1986 | Guttag et al. | 364/200 |
| 4,713,753 A | 12/1987 | Boebert et al. | 364/200 |
| 4,780,905 A | 10/1988 | Cruts et al. | 380/44 |
| 4,797,853 A | 1/1989 | Savage et al. | 364/900 |
| 4,907,268 A | 3/1990 | Bosen et al. | 380/4 |
| 5,006,823 A | 4/1991 | Baril et al. | 333/164 |
| 5,065,429 A | 11/1991 | Lang | 380/25 |
| 5,235,641 A | 8/1993 | Nozawa et al. | 380/21 |
| 5,268,870 A | 12/1993 | Harari | 365/218 |
| 5,293,424 A | 3/1994 | Hotley et al. | 380/23 |

(Continued)

FOREIGN PATENT DOCUMENTS

| | | |
|---|---|---|
| EP | 0 087 143 A1 | 8/1983 |
| EP | 0 461 983 A1 | 12/1991 |

(Continued)

OTHER PUBLICATIONS

Arbaugh et al., "A Secure and Reliable Bootstrap Architecture", Department of Computer & Information Science, Technical Reports (CIS), University of Pennsylvania, Year 1996.*

(Continued)

*Primary Examiner* — Morshed Mehedi
(74) *Attorney, Agent, or Firm* — Brinks Hofer Gilson & Lione

(57) ABSTRACT

A secure flash memory card or flash drive protects user content from unauthorized duplication. However, even the protected user content can be moved from one flash card or drive to another by its rightful owner or licensee. Additionally, secure firmware applications that may be added to the flash card over time in order to add additional functionality to the card may also be moved, although many of them are device specific and also designed to only operate on one particular piece of hardware.

18 Claims, 11 Drawing Sheets

U.S. PATENT DOCUMENTS

| | | | | |
|---|---|---|---|---|
| 5,311,595 | A | 5/1994 | Bjerrum et al. | 380/25 |
| 5,319,765 | A | 6/1994 | Kimura | 395/425 |
| 5,327,563 | A | 7/1994 | Singh | 395/700 |
| 5,404,485 | A | 4/1995 | Ban | 395/425 |
| 5,438,575 | A | 8/1995 | Bertrand | 371/48 |
| 5,442,704 | A | 8/1995 | Holtey et al. | 380/23 |
| 5,455,862 | A | 10/1995 | Hoskinson | 380/21 |
| 5,477,039 | A | 12/1995 | Lisimaque et al. | 235/380 |
| 5,606,660 | A | 2/1997 | Estakhri et al. | 395/183.14 |
| 5,629,513 | A | 5/1997 | Geronimi et al. | 235/492 |
| 5,710,639 | A | 1/1998 | Kuznicki et al. | 358/426 |
| 5,825,882 | A | 10/1998 | Kowalski et al. | 380/25 |
| 5,857,020 | A | 1/1999 | Peterson, Jr. | 380/4 |
| 5,860,082 | A | 1/1999 | Smith et al. | 711/103 |
| RE36,181 | E | 4/1999 | Koopman, Jr. et al. | 380/23 |
| 5,917,909 | A | 6/1999 | Lamla | 705/67 |
| 5,933,854 | A | 8/1999 | Yoshimura | 711/164 |
| 5,943,423 | A | 8/1999 | Muftic | 380/25 |
| 5,956,405 | A | 9/1999 | Yuval | 380/29 |
| 5,987,134 | A | 11/1999 | Shin et al. | 380/25 |
| 5,995,965 | A | 11/1999 | Experton | 707/10 |
| 6,026,402 | A | 2/2000 | Vossen et al. | 707/9 |
| 6,028,933 | A | 2/2000 | Heer et al. | 380/9 |
| 6,073,234 | A | 6/2000 | Kigo et al. | 713/161 |
| 6,101,588 | A | 8/2000 | Farley et al. | 711/168 |
| 6,148,354 | A | 11/2000 | Ban et al. | 710/102 |
| 6,154,544 | A | 11/2000 | Farris et al. | 380/262 |
| 6,158,004 | A | 12/2000 | Mason et al. | 713/200 |
| 6,181,252 | B1 | 1/2001 | Nakano | 340/825.31 |
| 6,182,229 | B1 | 1/2001 | Nielsen | 713/202 |
| 6,230,223 | B1 | 5/2001 | Olarig | 710/126 |
| 6,230,233 | B1 | 5/2001 | Lofgren et al. | 711/103 |
| 6,243,816 | B1 | 6/2001 | Fang et al. | 713/202 |
| 6,253,328 | B1 | 6/2001 | Smith, Jr. | 713/202 |
| 6,353,888 | B1 | 3/2002 | Kakehi et al. | 713/193 |
| 6,356,941 | B1 | 3/2002 | Cohen | 709/219 |
| 6,370,251 | B1 | 4/2002 | Hardy et al. | 380/286 |
| 6,371,377 | B2 | 4/2002 | Asoh et al. | 235/487 |
| 6,385,729 | B1 | 5/2002 | DiGiorgio et al. | 713/201 |
| 6,389,542 | B1 | 5/2002 | Flyntz | 713/201 |
| 6,393,565 | B1 | 5/2002 | Lockhart et al. | 713/172 |
| 6,422,460 | B1 | 7/2002 | Boesch | 235/380 |
| 6,434,700 | B1 | 8/2002 | Alonso et al. | 713/169 |
| 6,445,794 | B1 | 9/2002 | Shefi | 380/46 |
| 6,457,126 | B1 | 9/2002 | Nakamura et al. | 713/166 |
| 6,490,685 | B1* | 12/2002 | Nakamura | 713/193 |
| 6,522,655 | B1 | 2/2003 | Laiho | 370/410 |
| 6,577,734 | B1 | 6/2003 | Etzel et al. | 380/277 |
| 6,615,347 | B1 | 9/2003 | de Silva et al. | 713/156 |
| 6,615,352 | B2 | 9/2003 | Terao et al. | 713/184 |
| 6,629,192 | B1 | 9/2003 | Schaefer et al. | 711/103 |
| 6,671,808 | B1 | 12/2003 | Abbott et al. | 713/200 |
| 6,678,828 | B1 | 1/2004 | Pham et al. | 713/201 |
| 6,742,117 | B1 | 5/2004 | Hikita et al. | 713/172 |
| 6,754,765 | B1 | 6/2004 | Chang et al. | 711/103 |
| 6,763,399 | B2 | 7/2004 | Margalit et al. | 710/13 |
| 6,783,078 | B1 | 8/2004 | Leaming | 235/492 |
| 6,804,786 | B1 | 10/2004 | Chamley et al. | 713/201 |
| 6,810,123 | B2 | 10/2004 | Farris et al. | 380/262 |
| 6,829,676 | B2 | 12/2004 | Maeda et al. | 711/103 |
| 6,832,731 | B2 | 12/2004 | Kaneko | 235/492 |
| 6,845,908 | B2 | 1/2005 | Morita et al. | 235/382 |
| 6,848,045 | B2 | 1/2005 | Long et al. | 713/4 |
| 6,865,555 | B2 | 3/2005 | Novak | 705/59 |
| 6,880,079 | B2 | 4/2005 | Kefford et al. | 713/155 |
| 6,928,547 | B2 | 8/2005 | Brown et al. | 713/186 |
| 7,024,564 | B2* | 4/2006 | Pavlin et al. | 713/192 |
| 7,058,818 | B2 | 6/2006 | Dariel | 713/193 |
| 7,062,616 | B2 | 6/2006 | Sadhasivan et al. | 711/153 |
| 7,096,504 | B1* | 8/2006 | Tagawa et al. | 726/27 |
| 7,099,479 | B1* | 8/2006 | Ishibashi et al. | 380/281 |
| 7,120,729 | B2 | 10/2006 | Gonzalez et al. | 711/103 |
| 7,278,031 | B1* | 10/2007 | Best | 713/193 |
| 7,380,275 | B2* | 5/2008 | Srinivasan et al. | 726/17 |
| 7,657,742 | B2* | 2/2010 | Yamada | 713/168 |
| 2001/0019614 | A1 | 9/2001 | Madoukh | 380/277 |
| 2001/0025355 | A1 | 9/2001 | Palm et al. | 714/726 |
| 2002/0029343 | A1 | 3/2002 | Kurita | 713/185 |
| 2002/0034303 | A1 | 3/2002 | Farris et al. | 380/270 |
| 2002/0065730 | A1 | 5/2002 | Nii | 705/26 |
| 2002/0099666 | A1 | 7/2002 | Dryer et al. | 705/71 |
| 2002/0141588 | A1 | 10/2002 | Rollins | 380/277 |
| 2002/0145632 | A1 | 10/2002 | Shmueli et al. | 345/835 |
| 2002/0174337 | A1 | 11/2002 | Aihara | 713/172 |
| 2002/0176575 | A1 | 11/2002 | Qawami et al. | 380/201 |
| 2002/0178370 | A1 | 11/2002 | Gurevich et al. | 713/189 |
| 2002/0186842 | A1 | 12/2002 | Sabet-Sharghi et al. | 380/200 |
| 2002/0191794 | A1 | 12/2002 | Farris et al. | 380/260 |
| 2003/0018889 | A1 | 1/2003 | Burnett et al. | 713/153 |
| 2003/0028514 | A1 | 2/2003 | Lord et al. | 707/1 |
| 2003/0028797 | A1 | 2/2003 | Long et al. | 713/194 |
| 2003/0051160 | A1* | 3/2003 | Selkirk et al. | 713/201 |
| 2003/0061504 | A1 | 3/2003 | Sprigg et al. | 713/200 |
| 2003/0070083 | A1 | 4/2003 | Nessler | 713/193 |
| 2003/0084332 | A1* | 5/2003 | Krasinski et al. | 713/200 |
| 2003/0110169 | A1 | 6/2003 | Zuili et al. | 707/9 |
| 2003/0120938 | A1 | 6/2003 | Mullor | 713/190 |
| 2003/0131210 | A1 | 7/2003 | Mueller | 711/200 |
| 2003/0135739 | A1 | 7/2003 | Talton, Sr. | 713/185 |
| 2003/0149886 | A1 | 8/2003 | Ito et al. | 713/193 |
| 2003/0156473 | A1 | 8/2003 | Sinclair et al. | 365/200 |
| 2003/0163717 | A1* | 8/2003 | Yoshimoto et al. | 713/193 |
| 2003/0200458 | A1* | 10/2003 | Hori et al. | 713/200 |
| 2003/0204726 | A1 | 10/2003 | Kefford et al. | 713/171 |
| 2003/0212894 | A1 | 11/2003 | Buck et al. | 713/184 |
| 2004/0006703 | A1* | 1/2004 | Kitani et al. | 713/193 |
| 2004/0034785 | A1 | 2/2004 | Tai et al. | |
| 2004/0044625 | A1 | 3/2004 | Sakamura et al. | 705/41 |
| 2004/0066936 | A1 | 4/2004 | Farris et al. | 380/270 |
| 2004/0068631 | A1* | 4/2004 | Ukeda et al. | 711/163 |
| 2004/0083335 | A1 | 4/2004 | Gonzalez et al. | 711/103 |
| 2004/0083370 | A1 | 4/2004 | de Jong | 713/182 |
| 2004/0098585 | A1 | 5/2004 | Grove et al. | 713/168 |
| 2004/0103288 | A1 | 5/2004 | Ziv et al. | 713/185 |
| 2004/0117653 | A1 | 6/2004 | Shapira et al. | 713/201 |
| 2004/0123127 | A1 | 6/2004 | Teicher et al. | 713/193 |
| 2004/0128523 | A1 | 7/2004 | Fujioka | 713/189 |
| 2004/0132437 | A1 | 7/2004 | Ohmori et al. | 455/414.1 |
| 2004/0139021 | A1 | 7/2004 | Reed et al. | 705/50 |
| 2004/0153642 | A1 | 8/2004 | Plotkin et al. | 713/150 |
| 2004/0168081 | A1 | 8/2004 | Ladas et al. | 713/201 |
| 2004/0186994 | A1 | 9/2004 | Herbert et al. | 713/164 |
| 2004/0193925 | A1 | 9/2004 | Safriel | 713/202 |
| 2005/0005149 | A1* | 1/2005 | Hirota et al. | 713/193 |
| 2005/0010758 | A1 | 1/2005 | Landrock et al. | 713/156 |
| 2005/0010783 | A1 | 1/2005 | Libin et al. | 713/182 |
| 2005/0015588 | A1 | 1/2005 | Lin et al. | 713/159 |
| 2005/0033968 | A1 | 2/2005 | Dupouy et al. | 713/183 |
| 2005/0049931 | A1 | 3/2005 | Wisnudel et al. | 705/26 |
| 2005/0050330 | A1 | 3/2005 | Agam et al. | 713/172 |
| 2005/0081198 | A1* | 4/2005 | Cho et al. | 717/174 |
| 2005/0114620 | A1 | 5/2005 | Justen | 711/170 |
| 2005/0120205 | A1 | 6/2005 | Umezawa et al. | 713/156 |
| 2005/0154912 | A1* | 7/2005 | Kim et al. | 713/200 |
| 2005/0160217 | A1 | 7/2005 | Gonzalez et al. | 711/6 |
| 2006/0005046 | A1* | 1/2006 | Hars | 713/191 |
| 2006/0059375 | A1* | 3/2006 | Ooshima et al. | 713/193 |
| 2006/0087885 | A1* | 4/2006 | Murakami et al. | 365/185.17 |
| 2006/0176068 | A1 | 8/2006 | Holtzman et al. | 324/765 |
| 2006/0177064 | A1 | 8/2006 | Holtzman et al. | 380/277 |
| 2006/0239450 | A1 | 10/2006 | Holtzman et al. | |
| 2006/0242067 | A1 | 10/2006 | Jogand-Coulomb et al. | |
| 2006/0242151 | A1 | 10/2006 | Jogand-Coulomb et al. | 707/9 |
| 2006/0242429 | A1 | 10/2006 | Holtzman et al. | |
| 2007/0011724 | A1 | 1/2007 | Gonzalez et al. | 726/4 |
| 2007/0015589 | A1* | 1/2007 | Shimizu et al. | 463/43 |
| 2007/0056042 | A1 | 3/2007 | Qawami et al. | |
| 2007/0061570 | A1 | 3/2007 | Holtzman et al. | 713/168 |
| 2007/0061581 | A1 | 3/2007 | Holtzman et al. | 713/176 |
| 2007/0061597 | A1 | 3/2007 | Holtzman et al. | 713/193 |
| 2007/0061897 | A1 | 3/2007 | Holtzman et al. | 726/34 |
| 2007/0188183 | A1 | 8/2007 | Holtzman et al. | |
| 2007/0274179 | A1* | 11/2007 | Ito et al. | 369/47.12 |

FOREIGN PATENT DOCUMENTS

| | | |
|---|---|---|
| EP | 0 461 983 B1 | 4/1995 |
| EP | 0 715 245 A1 | 6/1996 |

| | | | |
|---|---|---|---|
| EP | 0 919 904 A2 | 8/1998 |
| EP | 1 004 992 A3 | 5/2000 |
| EP | 1 074 906 A1 | 8/2000 |
| EP | 1 209 657 A1 | 8/2000 |
| EP | 1 050 821 A2 | 11/2000 |
| EP | 1 273 996 A2 | 1/2003 |
| EP | 1 351 151 A2 | 10/2003 |
| EP | 1 467 312 A1 | 4/2004 |
| EP | 1 429 224 A1 | 6/2004 |
| EP | 1 487 170 A2 | 6/2004 |
| EP | 1 457 922 A3 | 9/2004 |
| EP | 1 496 419 A1 | 1/2005 |
| GB | 2 391 082 A | 7/2002 |
| JP | 2002288453 | 10/2002 |
| WO | WO 99/47989 | 9/1999 |
| WO | WO 99/64996 | 12/1999 |
| WO | WO 00/48063 | 8/2000 |
| WO | WO 02/25415 | 3/2002 |
| WO | WO 02/48846 A2 | 6/2002 |
| WO | WO 02/103495 A1 | 12/2002 |
| WO | WO 03/081544 A2 | 10/2003 |
| WO | WO 03/096287 A1 | 11/2003 |
| WO | WO 2004/040578 A2 | 5/2004 |
| WO | WO 2004/040586 A1 | 5/2004 |
| WO | WO 2004/086228 A1 | 10/2004 |
| WO | WO 2004/092886 A2 | 10/2004 |
| WO | WO 2004/112036 A1 | 12/2004 |
| WO | WO 2005/001653 A2 | 1/2005 |
| WO | WO 2005/010686 A2 | 2/2005 |
| WO | WO 2005/010688 A2 | 2/2005 |
| WO | WO 2005/013125 A1 | 2/2005 |

OTHER PUBLICATIONS

ISA/EPO, "Invitation to Pay Additional Fees," mailed on Mar. 8, 2007 in corresponding Int'l. App. No. PCT/US2006/003876, 7 pages.
ISA/EPO, "Notification of Transmittal of the International Search Report and the Written Opinion of the International Searching Authority, or the Declaration," mailed on Aug. 17, 2007 in corresponding Int'l. App. No. PCT/US2006/003876, 19 pages.
International Preliminary Report on Patentability for PCT/US2007/087900, dated Jul. 9, 2007, 8 pages.
Search Report issued in application No. PCT/US2007/087900 dated May 19, 2008, 6 pages.
Written Opinion issued in application No. PCT/US2007/087900 dated May 19, 2008, 7 pages.
U.S. Appl. No. 60/717,163, "Secure Yet Flexible System Architecture for Secure Devices with Flash Mass Storage Memory," filed Sep. 14 2005, Micky Holtzman.
U.S. Appl. No. 60/717,164, "Secure Yet Flexible System Architecture for Secure Devices with Flash Mass Storage Memory," filed Sep. 14, 2005, Holtzman, et al.
U.S. Appl. No. 60/717,347, "Hardware Driver Integrity Check of Memory Card Controller Firmware," filed Sep. 14, 2005, Holtzman, et al.
Akagi, A., "SD Format Verification," Matsushita Technical Journal Apr. 2002 vol. 49, No. 2 pp. 11-14 ISSN: 1343-9529.
Allard, J.J., "Dynamic Memory Array Card Burn In and High Speed Functional Card Testing," 1981 International Test Conference, Testing in the 1980's pp. 244-248.
Barsness, A.R. et al.,"ECC Memory Card with Built In Diagnostic Aids and Multiple Usage," IBM Technical Disclosure Bulletin, Apr. 1982 vol. 24, No. 11B pp. 6173-6174.
Communication Relating to the Results of the Partial International Search for International Application No. PCT/US2006/026241 mailed Dec. 18, 2006, 3 pages.
Deepakumara, Janaka, et al., "Performance Comparison of Message Authentication Code (MAC) Algorithms for the Internet Protocol Security (IPSEC) Electrical and Computer Engineering," Memorial University of Newfoundland, St. John's, NL, Canada, A1B3S7 http://www.engr.mun.ca/~howard/PAPERS/necec_2003b.pdf, 7 pages.
Dialog Search, Oct. 6, 2004 (15 pages).
Dialog Search, Oct. 3, 2005 (31 pages).
Discretix Technologies Ltd. "Secure Flash™ System Specification", Version 1.05, Jul. 15, 2004, Netanya, Israel (36 pages).
Engelbrecht, R., et al., ByMedCard—An Electronic Patient Record with Chip Card Functionality, Health Cards '97 Fourth International Congress pp. 313-317.
Guibert, H.; Gamache, A., Optical Memory Card Applicability for Implementing a Portable Medical Record, Medical Informatics Jul.-Sep. 1993 vol. 18, No. 3 pp. 271-278 ISSN: 0307-7640.
Haller, et al., "A One-Time Password System," IETF Standard-Working-Draft, Internet Engineering Task Force, IETF, No. 1, Mar. 24, 1997, XP015024796, pp. 1-8.
Hoornaert, "Vasco Data Security Enables Secure Communications Over the Internet," IS Audit & Control Journal, vol. IV, 1999, 3 pages.
Identification Cards—Contactless Integrated Circuit(s) Cards—Proximity Cards—Part 1: Physical Characteristics, ISO_IEC_14443-1_2000_PDF, 10 pages.
Identification Cards—Contactless Integrated Circuit(s) Cards—Proximity Cards—Part 2: Radio Frequency Power and Signal Interface, ISO_IEC_14443-2_2001_PDF, 18 pages.
iKey 1000, Workstation Security and Secure Remote Access, SafeNet, 2004, 2 pages.
iKey 2032, Personal USB Authentication and Encryption Token, SafeNet, 2005, 2 pages.
ISA/EPO, "Invitation to Pay Additional Fees", mailed on Jan. 26, 2007 in corresponding Int'l. App. No. PCT/US2006/035839, 2 pages.
ISA/EPO, "Invitation to Pay Additional Fees", mailed on Dec. 18, 2006 in corresponding Int'l. App. No. PCT/US2006/026241, 7 pages.
ISA/EPO, "Notification of Transmittal of the International Search Report and the Written Opinion of the International Searching Authority, or the Declaration," mailed on Feb. 8, 2007 in corresponding Int'l. App. No. PCT/US2006/026241, 9 pages.
ISA/EPO, "Notification of Transmittal of the International Search Report and the Written Opinion of the International Searching Authority, or the Declaration," mailed on Mar. 29, 2007 in corresponding Int'l. App. No. PCT/US2006/035840, 6 pages.
ISA/EPO, "Notification of Transmittal of the International Search Report and the Written Opinion of the International Searching Authority, or the Declaration," mailed on May 25, 2007 in corresponding Int'l. App. No. PCT/US2006/035839, 9 pages.
ISA/EPO, "Written Opinion of the International Searching Authority," mailed on Feb. 8, 2007 in corresponding Int'l. App. No. PCT/US2006/026241, 15 pages.
ISA/EPO, "Written Opinion of the International Searching Authority," mailed on Mar. 29, 2007 in corresponding Int'l. App. No. PCT/US2006/035840, 8 pages.
ISA/EPO, "Written Opinion of the International Searching Authority," mailed on Sep. 13, 2006 in corresponding Int'l. App. No. PCT/US2006/035839, 12 pages.
Johnson, D., "Bus Emulation Drives Production Testing," Test & Measurement World Feb. 1995 vol. 15, No. 2 pp. 41-42, 44, 46, 48 ISSN: 0744-1657.
Nystrom RSA Security M: "The Protected One-Time Password Protocol (EAP-POTP)," IETF Standard-Working-Draft, Internet Engineering Task Force, IETF, CH No. 2, Jun. 30, 2005, XP015040287.
O.J. Horak, "Means and Measures for Data Security," Armed Forces Data Processing Agency, Stifgasse 2a, A-1070 Wien, Austria, IFAC SAFECOMP '89, Vienna, Austria, 1989, 9 pages.
Open Specifications Integrate One-Time Passwords with Enterprise Applications, RSA Security, Feb. 2005, 10 pages.
Orlowski, Andrew, "Everything You Ever Wanted to Know About CPRM, But ZDNet Wouldn't Tell You . . . ," The Register.co.UK, Jan. 10, 2001, 6 pages.
Pinkas, Benny, "Efficient State Updates for Key Management," STAR Lab, Intertrust Technologies, Princeton, NJ, DRM 2001, LNCS 2320 pp. 40-56, 2002.
Renesas, X-Mobile Card, Digital Rights Management, Authentication and Secure Storage for Mobile Devices, Providing Remote Access and Secure Storage Solutions for IT, Advanced Solutions Group, 2005, 4 pages.
RSA Security Inc.: "A CryptoAPI Profile for One-Time Password Tokens V1.0 Draft 2" One-Time Password Specifications (OTPS), Jun. 27, 2005, XP002416270.

RSA Security Inc.: "OTP-WSS-Token: Web Services Security One-Time-Password (OTP) Token Profile, Version 1-0d3", One-Time Password Specifications (OTPS), Jul. 6, 2005, XP002416269.

RSA Security Inc.: "PKCS#11 Mechanisms for One-Time Password Tokens V1.0 5th Draft", One-Time Password Specifications, Jun. 27, 2005, XP002415773.

RSA Security, "Federated Identity Management and Return on Investment," White Paper, 2004-2005, 12 pages.

RSA Security, "Federated Identity Manager, A Technical Overview," Technology Backgrounder, 2005, 16 pages.

RSA Specification, "Cryptographic Token Key Initialization Protocol, V1.0 Draft 3," RSA Security, Jun. 14, 2005, 29 pages.

Rubin, "Independent One-Time Passwords," USENIX Association, Proceedings of the Fifth USENIX UNIX Security Symposium, Jun. 5-7, 1995, 13 pages.

Rubin, "Independent One-Time Passwords," USENUIX, A Quarterly dedicated to the analysis and understanding of advanced computing systems, vol. 9, No. 1, Winter 1996, 15 pages.

SafeNet AXIS, "Strong Authentication and Single Sign-On," AXIS Instant Logical & Physical Access Security, 2005, 2 pages.

SanDisk Corporation "BE2 Architecture", Revision 1.1, Jun. 9, 2003 (21 pages).

SanDisk Corporation I, "CryptoFlash Integration in BE2", Revision 1.21, Oct. 19, 2004, (34 pages).

Secure Business-to-Business Single Sign-On (B2B SSO) Based on Federated Identity Management, RSA Security, 2004-2005, 6 pages.

Seitz, et al., "Key Management for Encrypted Data Storage in Distributed Systems," Proceedings of the Second IEEE International Security in Storage Workshop (SISW'03), 11 pages.

ST Microelectronics: "Trusted Platform Module (TPM)"; May 2004; XP-002345888; 5 pages.

Tsuchida, S., "Test and Repair of Non-Volatile Commodity and Embedded Memories," Proceedings International Test Conference 2002 (Cat. No. 02CH37382) p. 1223 ISBN: 0 7803 7542 4.

U.S. Appl. No. 11/317,862, "Secure Memory Card with Life Cycle Phases", filed Dec. 22, 2005, Holtzman et al.

VeriSign, "Extending Managed PKI Services to Smart Cards for Greater Convenience and Security," 2001, 14 pages.

VeriSign, "Trusted Federated Identity Solution Architecture," 2004, 16 pages.

Weippl, Edgar, "An Approach to Role-Based Access Control for Digital Content," Software Competence Center Hagenberg Hauptstr. 99 A4232 Hagenberg, Austria, 2001, 5 pages.

Wu, D.M., Doney, R., "A Universal Self-Test Design for Chip, Card and System," Proceedings 1992 IEEE International Workshop on Defect and Fault Tolerance in VLSI Systems (Cat. No. 92TH0481-2) pp. 305-314 ISBN: 0 8186 2837 5.

Black, John, "Comments to NIST concerning AES Modes of Operations: A Suggestion for Handling Arbitrary-Length Messages with the CBC MAC," University of Nevada, Reno, Phillip Rogaway, University of California at Davis http://csrc.nist.gov/CryptoToolkit/modes/proposedmodes/xcbc-mac/xcbc-mac-spec.pdf, 2000 (3 pages)

Frankel, Sheila, "RFC 3566—The AES-XCBC-MAC-96 Algorithm and Its Use With IPsec," NIST-National Institute of Standards and Technology, 820 West Diamond Ave, Room 677,Gaitbersburg, MD 20899, http://www.faqs.org/rfcs/rfc3566.html, Sep. 2003 (10 pages)

Gemplus, Employee Smart Badge, One Integrated and Secure Smart Badge to Manage All Access, 2003 (2 pages).

Lee, et al., "Modified Token-Update Scheme for Site Authentication, School of Computer Science and Engineering," Inha University, Incheon, 402-751, Korea, 2005 (6 pages).

Yang, et al., "CD-Rom Versus Web-Access to External Databases-Experiences and Insights," Rider University Libraries, pp. 193-200, 2000.

* cited by examiner

METHOD AND APPARATUS FOR UPGRADING A MEMORY CARD THAT HAS SECURITY MECHANISMS FOR PREVENTING COPYING OF SECURE CONTENT AND APPLICATIONS

CROSS REFERENCE TO RELATED APPLICATION

This application claims the benefit of U.S. Provisional Patent Application No. 60/882,268 filed Dec. 28, 2006 entitled "Upgrading a Memory Card That Has Security Mechanisms That Prevent Copying Of Secure Content and Applications" to Michael Holtzman et al. This application is incorporated in its entirety by reference as if fully set forth herein.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

FIELD OF THE INVENTION

The invention generally relates to memory cards with secure content and copy protection mechanisms, and in particular relates to allowing transferring of secure content to another memory card in the event of an upgrade.

BACKGROUND OF THE INVENTION

There are many different types of protection mechanisms that prevent unauthorized copying and duplication of digital content. Many of these are often loosely referred to and thought of as a type of digital rights management ("DRM"). Great efforts have been made specifically to stop duplication and transfer from device to device. For example, musical or audio-visual content cannot be transferred from one iPod to another in order to prevent what may include unauthorized duplication. Likewise, in a secure memory card, SIM card, megaSIM card, or USB flash drive (collectively referred to hereafter as a "card"), protected content cannot be moved from card to card.

SUMMARY OF INVENTION

Various different embodiments of the present invention allow a user to move or transfer the contents of a card to a card of equal or larger capacity when a user wishes to upgrade to larger capacity card. Other embodiments allow transfer of content regardless of the capacity of the source and target, so log as the quantity of data to be moved will fit in the target. The target must have an equal or greater level of security than the source if copy protected content is to be moved to the target. Different methods are used to determine the authenticity of the target before the protected content can be moved. In embodiments of a card where the firmware and other software of the card is inoperable in any card other than the original card in which it was loaded, embodiments of the invention overcome this obstacle and re-bind them to a new card so that the transferred copy protected content can be decrypted, which would otherwise be strictly forbidden outside of an authorized upgrade.

Additional aspects, advantages and features of the present invention are included in the following description of exemplary examples thereof, which description should be taken in conjunction with the accompanying figures, and wherein like numerals are used to describe the same feature throughout the figures, unless otherwise indicated.

DETAILED DESCRIPTION OF THE PREFERRED EMBODIMENTS

Figure 1A:
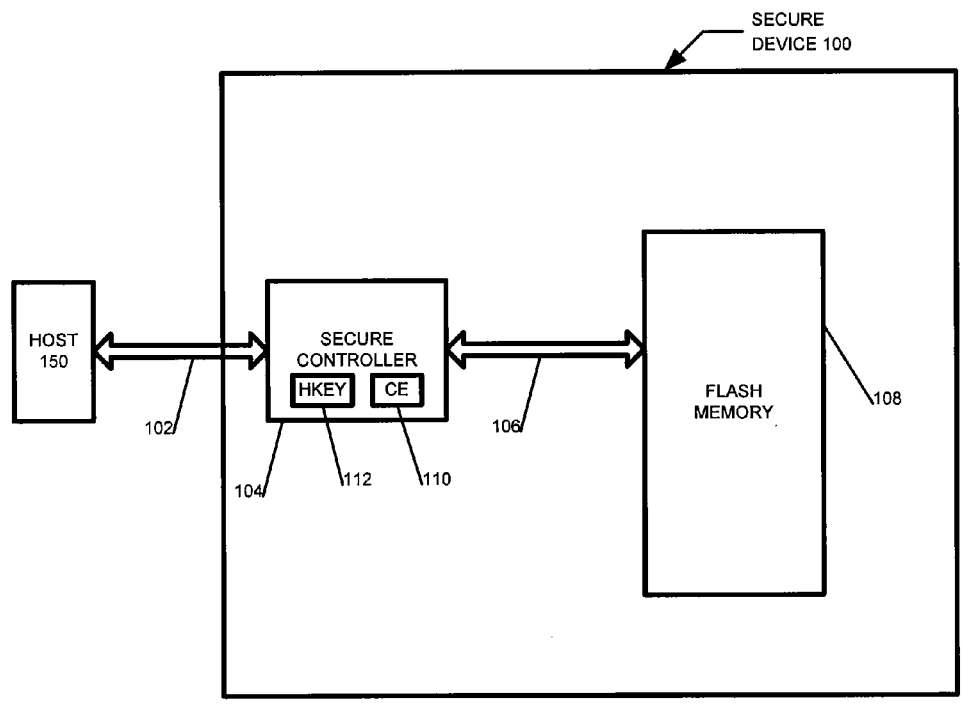
FIG. 1A is block diagram of secure device 100.

FIG. 1A illustrates secure mass storage device 100, one embodiment of a secure system. As mentioned previously, in a secure flash mass storage memory card, SIM, megaSIM, or USB flash drive (collectively referred to as a "card" or secure device), protected content cannot be used by more than one card to prevent illegal copies. Secure device ("SD") 100 comprises mass storage memory 108, which is preferably of a NAND flash variety, and secure memory controller 104 that communicates to memory 108 via data and control lines 106. The secure device communicates with host 150 via host interface 102. The secure memory controller 104 controls all of the data storage and retrieval to/from memory 108 and transfer to/from host 150. Secure memory controller 104 (in conjunction with the card firmware) provides the security to SD 100. Memory controller 104 comprises an encryption or cryptographic engine 110 and a hardware key 112 that is preferably located within and accessible only to crypto engine 110. The hardware key 112 is different from soft keys in that it is not accessible to any software/firmware, whether the software/firmware is located and running either inside or outside of the card. In other words, the hardware key 112 is not meant for usage in encrypting user files. The hardware key is used to encrypt or sign the firmware that runs the card. It effectively binds the firmware of the card to the specific hardware of the card such that the firmware will not be usable if it is in any other card. If the particular controller and encryption engine that encrypted and signed the hardware is not present, the firmware will not run. This prevents fraudulent firmware which may allow unauthorized copying. For further information on this embodiment of a secure system, please refer to U.S. patent application Ser. No. 11/285,600 to M. Holtzman et. al, entitled "Hardware Driver Integrity Check of Memory Card Controller Firmware."

Figure 1B:
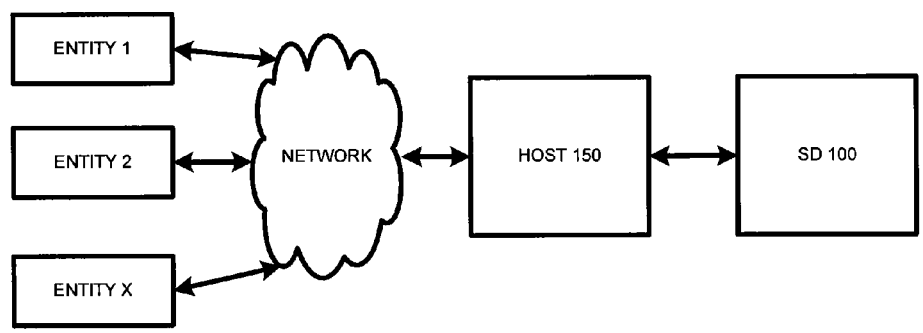
FIG. 1B is schematic diagram of secure device 100 networked to other entities via host 150.

FIG. 1B illustrates SD 100 communicating to various entities networked to host 150, over, for example, the Internet.

Secure transactions or other interactions may be made between SD 100, host 150, and the various networked entities.

Figure 2:
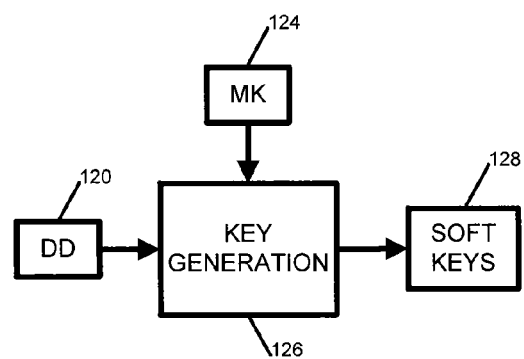
FIG. 2 is a diagram of diversification.

FIG. 2 illustrates diversification, which is another technique frequently utilized in limiting content to a specific device. The diversification shown in FIG. 2 relates to the soft keys, which are the keys used by the card firmware and other secure applications to encrypt and decrypt content and thereby prevent unauthorized duplication of content and other files. Diversification data 120 and a master key 124 are input into a key generation algorithm to produce the soft keys 128. The diversification data may be unique to a particular card, for example, a serial number or (trusted) ID of the card, or may be unique to a particular user. The soft keys 128, some of which are a function of the diversification data, may therefore also be unique, and thus, if a master key is comprised, all will not be lost on a global basis. Soft keys 128 may comprise any number and type of different soft keys, some of which may be device specific and some of which may not. For example, one soft key may be device specific whereas another soft key, used together with or independently of the device specific key, may be content and/or user specific. The diversification data may comprise both a reference and a value. In such a case, the value is preferably used for the diversification function shown in FIG. 2. The soft keys may also be referred to as a sort of credential, and may comprise both a name or title and a value. The key generation function may differ for different applications in both the host and in the card itself. Card applications such as secure applications 142 will be discussed in more detail below.

The firmware of the card may have any number of different security routines and mechanisms that prevent unauthorized duplication or transfer of user files. For more information on other security mechanisms and techniques present in SD 100, please refer to the following patent applications and patents, all of which are hereby incorporated by reference in the entirety: "Secure Yet Flexible System Architecture for Secure Devices With Flash Mass Storage Memory" to M. Holtzman et al., application Ser. No. 11/317,339; "Secure Memory Card With Life Cycle Phases" to M. Holtzman et al., application Ser. No. 11/317,862; "In Stream Data Encryption/Decryption and Error Correction Method" to M. Holtzman et al., application Ser. No. 11/313,447; "Control Structure for Versatile Content Control" to F. Jogand-Coulomb et al., application Ser. No. 11/313,536; "System for Creating Control Structure for Versatile Content Control" to F. Jogand-Coulomb et al., application Ser. No. 11/314,055; "Mobile Memory System for Secure Storage and Delivery of Media Content" to B. Qawami et al., application Ser. No. 11/322,766; and "In Stream Data Encryption/Decryption Method" to M. Holtzman et al., application Ser. No. 11/314,030. The present application should not be limited to those security techniques or mechanisms in the aforementioned applications.

In the case of some cards, secure applications 142 may also be loaded onto the card during the life of the card. These applications run on top of the system firmware and may involve additional manipulation of confidential data. For example, applications that allow password management can be added to increase the functionality of a memory card or USB flash drive. For more information on this please refer to U.S. patent application Ser. No. 11/319,835 to Gonzalez et al. entitled "Mass Storage Device With Automated Credentials Loading." As another example, applications relating to medical or financial records can be loaded into the card. These software or firmware applications are executed by a processor of the card, alone or in combination with the processor of a host device, and may not only handle confidential information, but also the secret information used in encrypting and safeguarding the contents of the card. As such, they may be deeply interconnected and reliant upon the security mechanisms and information within the card. In some cases, the security mechanisms of the applications themselves utilize card specific information and will not function on another card. The applications themselves may also be encrypted and device specific in order to prevent them from being copied and hacked.

In essence, these security mechanisms aim to make it impossible to copy secure or "copy protected" user files to another device and thereafter utilize them with the other device. As an example, in some cards, a copied song may not be played back from a card or host coupled to the card. This has the unfortunate result in some devices that even the authorized owner or licensee of the protected content cannot move it from one of his devices to another, even though only one instance of the content will exist, both before and after the move.

Figure 3:
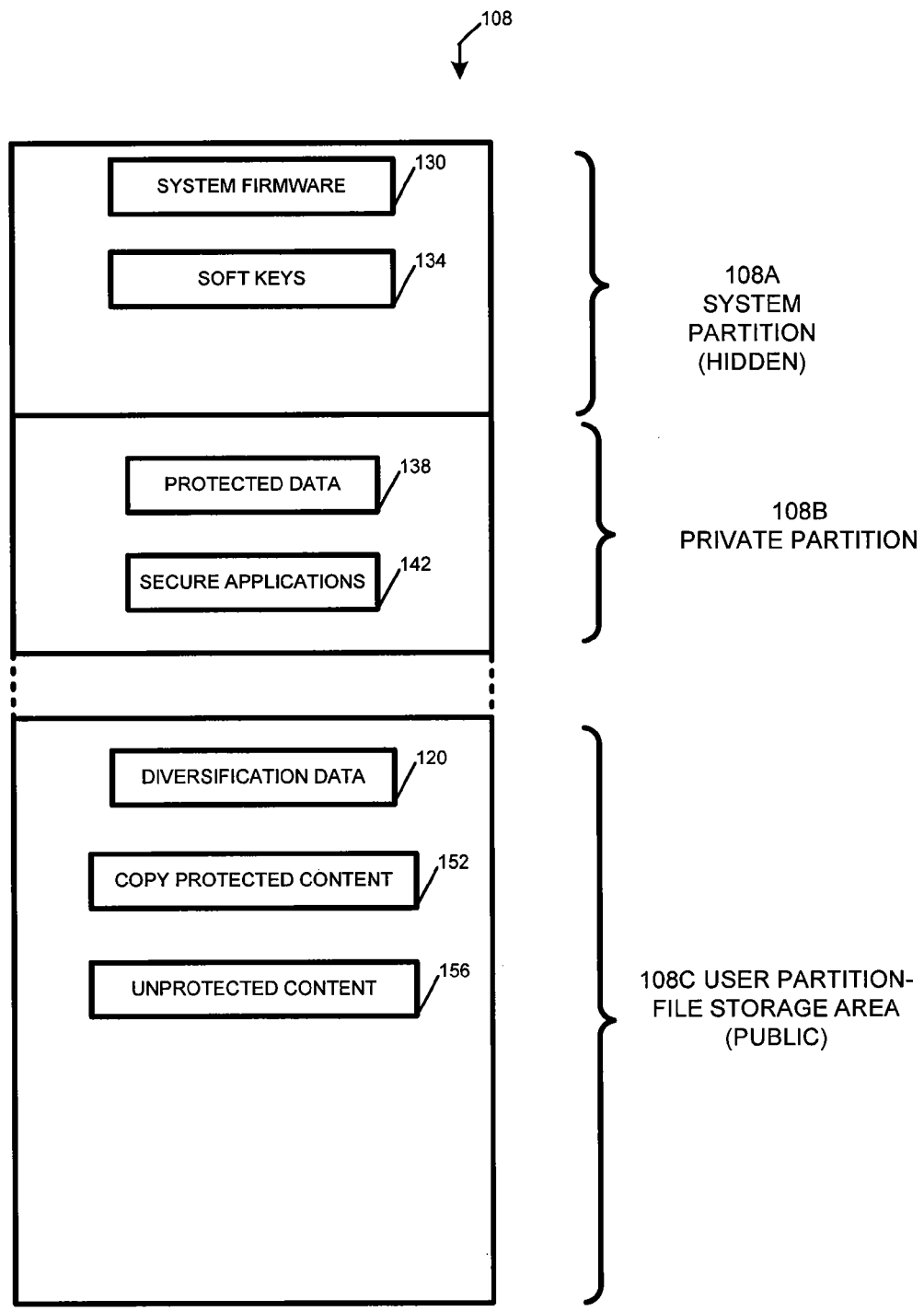
FIG. 3 is a diagram of memory 108 of FIG. 1A.

Referring to FIG. 3, the memory space of mass storage flash memory ("MSM") 108 is shown. MSM 108 comprises a system partition or area 108A that is hidden from a user/host. Stored within the system partition 108A is system firmware 130 and soft keys 134. System firmware 130 is the operating firmware that controls all data storage operations of SD 100 and communications with host device 150. The soft keys are keys that can be utilized by software of the device, including the firmware, to encrypt and decrypt data within SD 100. This differs from hardware key 112 that is not available for general encryption/decryption of user files, as mentioned earlier. MSM 108 may also comprise private partition 108B and user partition 108C. In certain embodiments one partition may serve as both the system and private partition. Secure applications 142 and protected data 138 may be stored in private partition 108B. Protected data may be any type of operating parameter or other data that is desirable to have safeguarded from unfettered access, which would be the case if it were stored in user partition 108C. Secure applications 142 run on top of system firmware 130 and may comprise security routines that utilize soft keys 134, alone or in combination with keys provided by the secure application itself. These applications 142 provide additional functionality to the card above and beyond typical data storage operations, and can be added by a user at anytime during the life of the card. Furthermore, the secure application may use information specific to the card (e.g. diversification data 120) that will only function on the specific card upon which the application was loaded. For example, a secure application may generate one time passwords using a serial number or other diversification data of the card, and then submit them for login or verification of a user or user's account. This is only an example, and any number of algorithms used in security or other functions may be based upon, at least in part, card specific data. The applications may be loaded over time by a user. All of these applications should ideally be transferred to a target card and function after upgrade, despite the fact that the underlying hardware has changed. This difficulty will be addressed later.

Data stored in user partition 108C is generally publicly available. User partition 108C comprises diversification data 120, copy protected content 152, and unprotected content 156. Diversification data 120 comprises information used to diversify a master key or keys into keys that are derived from the master key(s) but limited to a subset of devices or users such that if the derived keys are compromised, not all instances of a particular file can be pirated or freely reproduced. Copy protected content is content that is either restricted from being transferred, or alternatively content that may be transferred or copied but useless without the proper means to access it. The security may be provided by the system firmware 130, soft keys 134, and/or secure applications 142. In many embodiments, copy protected content is typically encrypted, and although the encrypted content may be copied, it cannot be decrypted unless a device is authenticated or authorized and has the proper keys to decrypt the content.

Figure 4A:
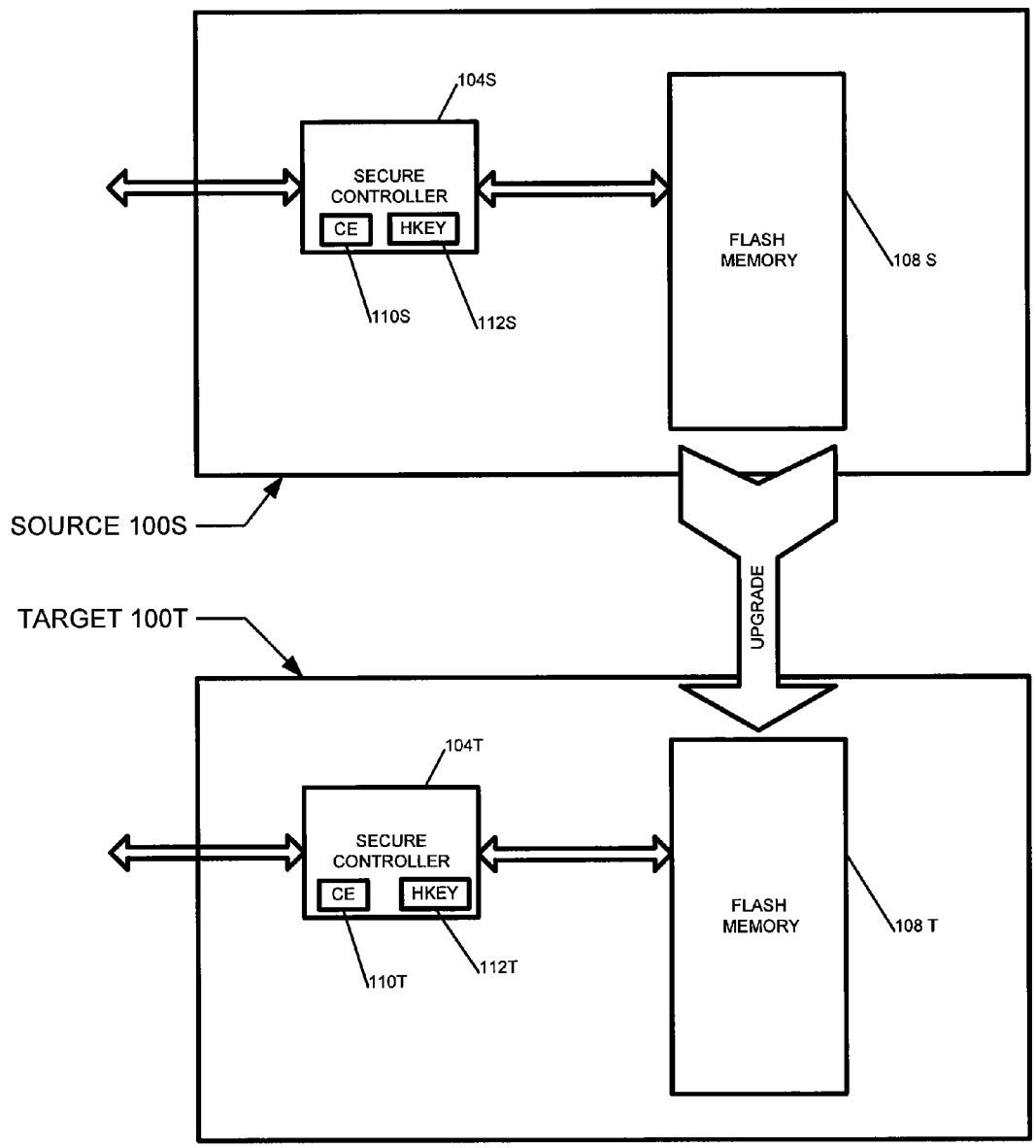
FIG. 4A is a diagram illustrating upgrade from source to target.

FIG. 4A depicts the upgrade process wherein the contents of memory 108S of source 100S is transferred to memory 108T of target 100T. As mentioned earlier, in an embodiment of device 100, each specific controller will have a unique hardware key that binds at least the system firmware 130 of device 100 to the controller (upgrade may also take place with other embodiments of the source and target, and the process taught herein is not limited to such exemplary embodiments). Thus, the system firmware originally loaded into source 100S and bound to the controller and other hardware of source 100S will not function once copied into target 100T. This means that card 100T simply will not function by default. Secure applications 142 and soft keys 134 in certain embodiments may also be bound to unique hardware, and not functional or accessible to hardware with which they are not bound. This must be overcome in a successful upgrade.

Figure 4B:
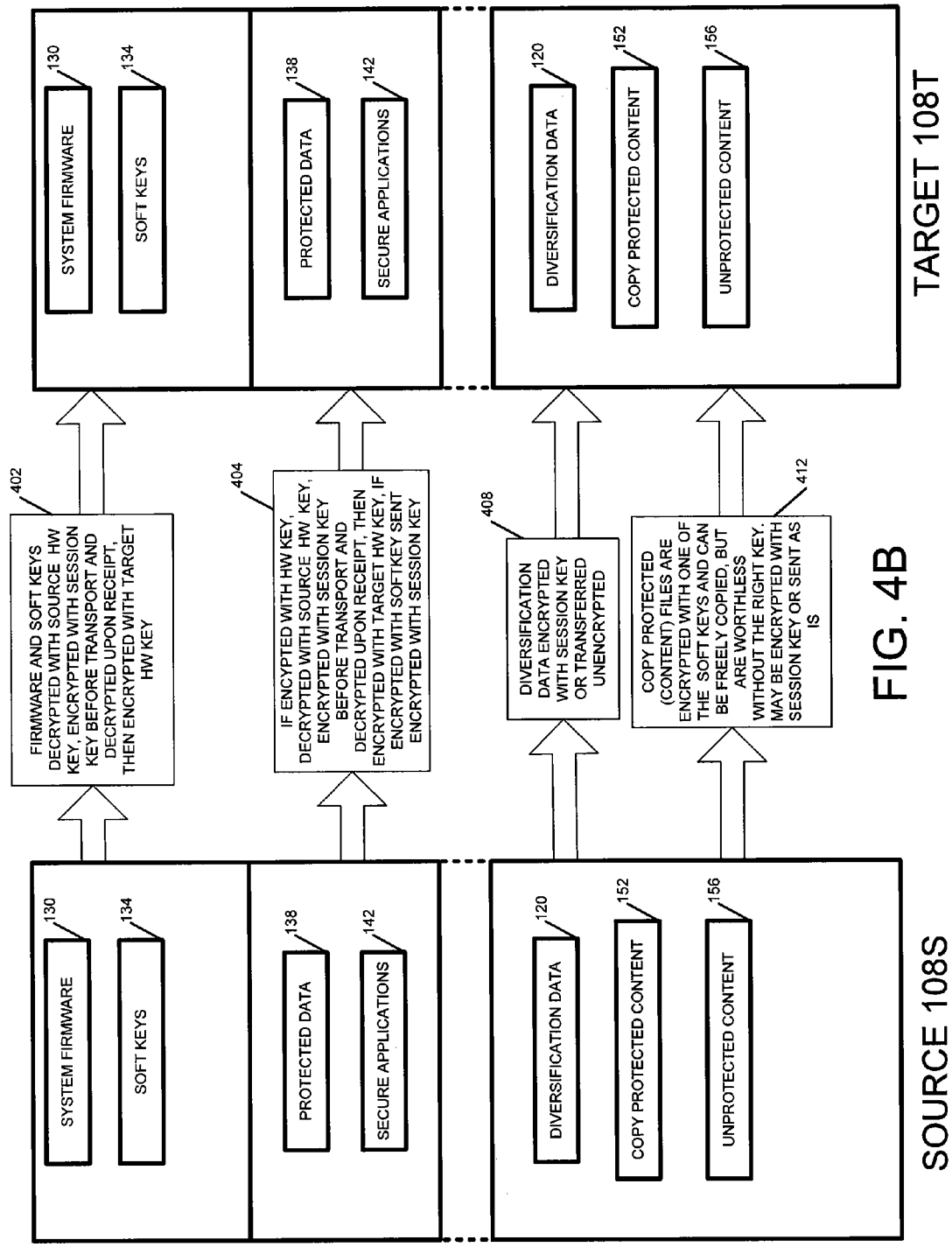
FIG. 4B is a diagram further illustrating how material is copied from source to target during upgrade, according to an embodiment of the invention.

FIG. 4B illustrates the transfer of the various items stored in source mass storage memory 108S to the target mass storage memory 108T. The transfer occurs through one or more host devices that may be local or remotely located. As seen in step 402, system firmware 130 and soft keys 134 of system partition 108A are decrypted with the source HW key 112S, encrypted with a session key, and then decrypted with the session key upon receipt at the target where they are then again encrypted with the target HW key 112T. In this way the system firmware and soft keys are unbound from the source HW and then subsequently rebound to the target HW. The session key protects the data while it is being transported from source to target, and is preferably used although in certain embodiments it may not be necessary and/or utilized. The encryption by the HW target key is preferably done "on the fly" as they pass through the encryption engine 110T of the target. For further information on the "on the fly" encryption/decryption please refer to "In Stream Data Encryption/Decryption and Error Correction Method" to M. Holtzman et al., application Ser. No. 11/313,447.

The protected data 138 and secure applications of private partition 108B are also transferred from source to target as seen in step 404. If they are encrypted with a HW key, they are decrypted with the source HW key, encrypted with a session key for transport and subsequently decrypted, and again encrypted with the target HW key as described above. In embodiments where they are simply encrypted with soft keys 134 or other keys of secure applications 142, they are then preferably encrypted with a session key and decrypted with the session key after transport. Again, as mentioned above, while usage of the session key is preferable it may be omitted in certain embodiments, for example, in scenarios where the host and transport process may occur in a known secure environment or over a private network.

Diversification data 120 may be encrypted with the session key or sent in an un-encrypted state, as represented by step 408. This is also true for unprotected content 156.

Copy protected content 152 such as music, films and other sensitive content, and the like is also transferred from source to target, as represented by step 412. As mentioned previously, the copy protection of the content is provided by system firmware 130 alone, or in conjunction with secure applications 142. It is encrypted with soft keys 134 alone or with other keys provided by the providers of secure applications 142. The secure applications may call the security routines and/or soft keys of the system firmware through an API of the firmware, or may utilize keys provided with and by the secure applications. Furthermore, the secure applications may provide an additional layer of encryption above and beyond that provided by the system firmware 130 and soft keys 134. In any case, the copy protected content may be transferred as it is stored in the target, or further encrypted with a session key during transport before being decrypted with the session key upon arrival at the target.

It is important that the protected content is not duplicated in such a fashion that additional unauthorized copies are not made and in a way that the protected content cannot be available at both the source and one or more targets. The device must protect itself from aborted upgrades, and other hacks or attacks while at the same time ensuring that both source and target remain functional in the case of an inadvertent failure during the upgrade process. A state machine of the device enables this in conjunction with the system firmware.

In certain embodiments, after the upgrade has taken place, the target will contain both the target's original diversification data, and the source's diversification data. This is especially useful in the situation where the contents of the target are merged with pre-existing contents of the source. In certain embodiments, similar to the diversification data, the soft keys and/or credentials after upgrade may include both those of the target and the source.

Figure 5A:
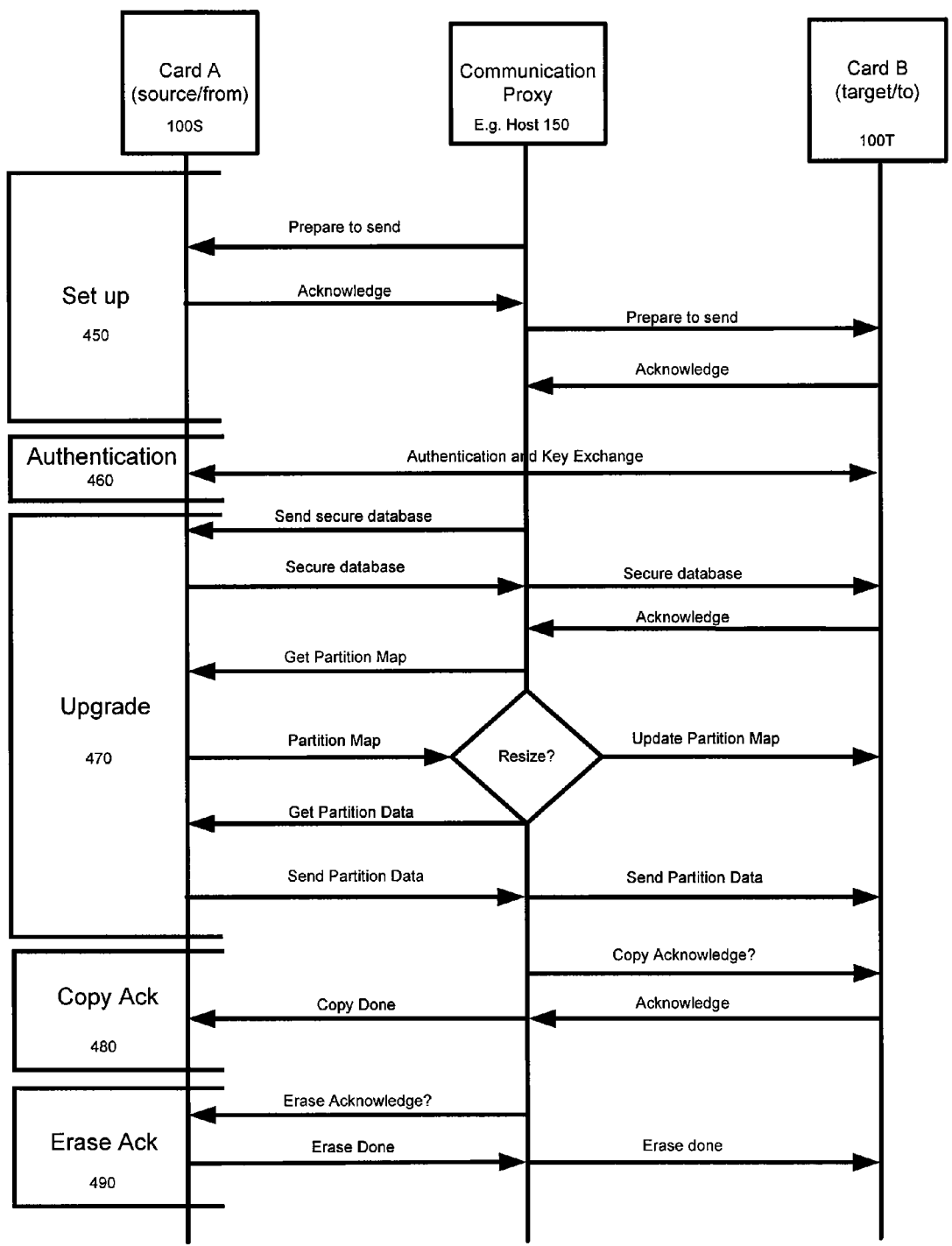
FIG. 5A illustrates an upgrade protocol, according to an embodiment of the invention.

FIG. 5A illustrates an upgrade protocol, according to an embodiment of the invention. The transfer from source 100S to target 100T goes via a communication proxy which may comprise anywhere from a single computer to several networked computers. For example, the communication proxy may comprise a host 150 coupled through the Internet to several other computers and eventually the target. The upgrade may also take place sequentially with source data temporarily stored remotely for some period before it is loaded on the host.

The protocol comprises 5 main stages, phases, or steps. These are correlated with states of the state machine. The first is the set up of the devices for the upgrade, as seen in step 450. The proxy will prepare both the source and target to send/receive data. Each of them will in turn acknowledge that they are prepared.

The second state/step of the protocol is authentication, as seen in step 460. This may involve authentication of the target, or alternatively authentication of both the source and target. In some embodiments the authentication comprises a mutual authentication where both the source and target authenticate each other. This type of authentication involves a key exchange. Some preferred methods of authentication will be discussed later with regard to FIGS. 5C, and 6.

The third state/step of the protocol is the upgrade transfer itself, as seen in step 470. As part of this state, the proxy instructs the target to send the secure database, which comprises system firmware 130, soft keys 134, and optionally protected data 138 and secure applications 142 if present. The source then sends a copy of the secure database through the proxy to the target. The proxy then gets the partition map from the source and determines if the partition map should be resized for the target. The target will have equal or greater storage capacity as the source, and it may be desirable for any number of reasons to alter and/or resize the partition map. Additionally, user demands and input may dictate resizing the partitions and thus altering the partition map. If the map does not need to be resized then the partition data will be retrieved from the source and passed onto the target without first being updated.

The fourth state/step of the protocol is the copy acknowledgement, as seen in step 480. The proxy requests that the target acknowledge that the copy operation has been completed successfully, and once that it is done it informs the source that the copy operation was successfully completed.

The fifth state/step of the protocol is the erasing of the source, as seen in step 490. The erase will only be done if the copy operation was successful. Otherwise, there is a risk that neither the source nor the target will have the complete contents of the memory. The proxy requests that the source acknowledge that the erase has been completed, and when the acknowledgement is received, the target is informed. With this information, the target may be used. In some embodiments this involves an activation step.

Figure 5B:
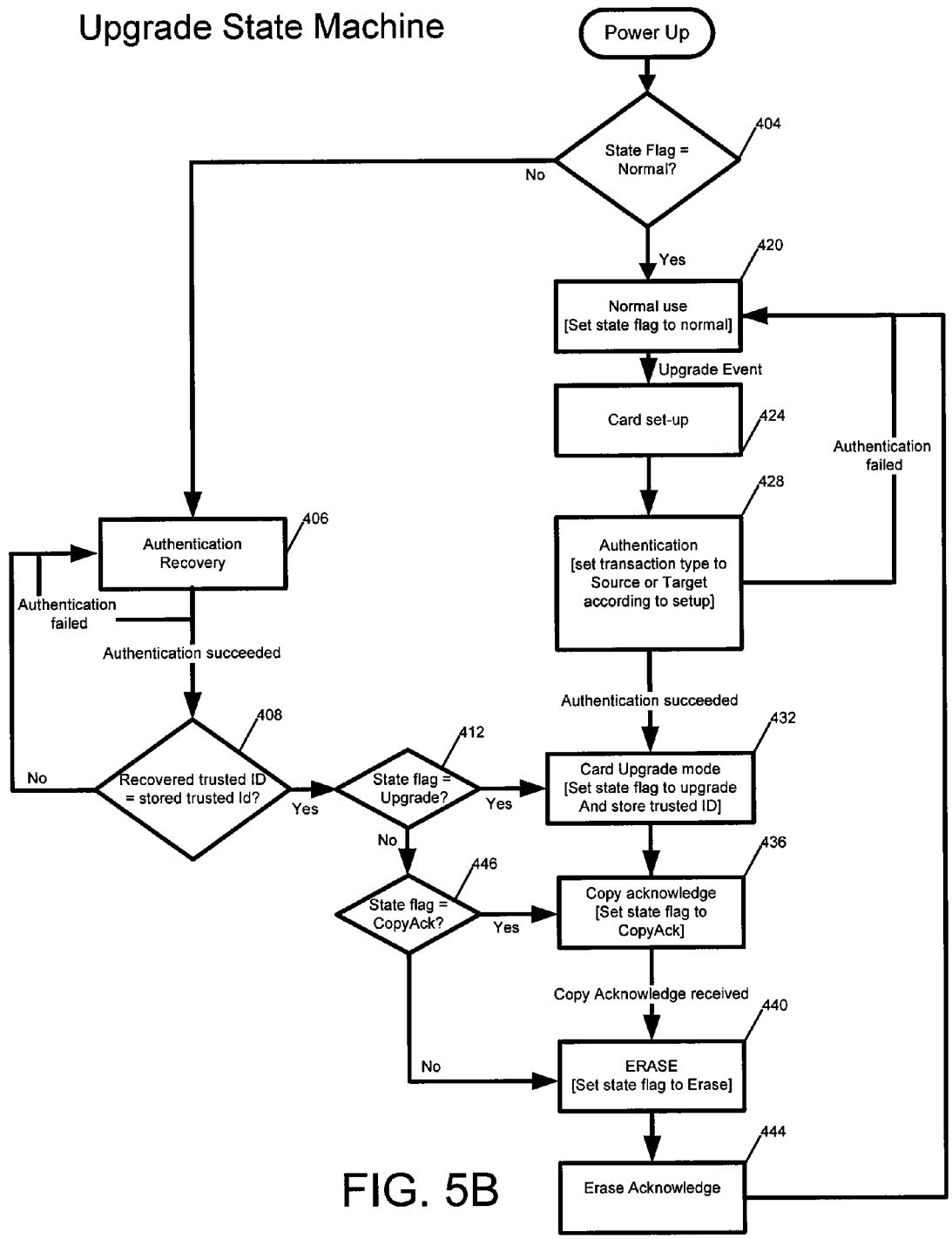
FIG. 5B illustrates the states of the upgrade state machine, according to an embodiment of the invention.

FIG. 5B is a state diagram that illustrates the states of a card upgrade state machine of device 100 as it is involved with the protocol shown in FIG. 5A or other upgrade protocols or processes. The state machine and upgrade protocol are designed to ensure that if the upgrade process is interrupted for any reason, that the upgrade resumes without any breach of security, and that if upgrade is for some reason not possible that both target and source remain usable. The text on the arrows describes the events triggering a state change. If there is no text at an arrow, the state change occurs when the aforementioned protocol phases/states are over. After power up of the device or card the state flag is checked to see if the state of the card is normal, as seen in diamond 404. If it is not, this indicates that the device is recovering from a failed upgrade and the device will attempt to recover what may be a failed authentication or to re-authenticate with the target, as indicated by box 406. The device will try to re-authenticate a finite number of times if authentication (recovery) is not successful. When recovering from an aborted upgrade process, the card will not revert to a normal state unless the process completes after a successful authentication. As part of the authentication process, the trusted ID or alternatively the serial number of the device will be read. If the trusted ID read from the device is the same as the stored trusted ID, as seen in diamond 408, the state flag will be checked, as seen in diamond 412. If the flag indicates that the card is in upgrade state, the card is determined to be in upgrade mode as seen in box 432. If it is not in upgrade mode it will then be determined if it is in copy acknowledge state as seen in diamond 416. If it is in copy acknowledge state/mode the, state will be indicated as such, as represented by box 440. If it is not, it will be in erase state or will alternatively be set to the erase state, as represented by box 440. Finally, the card will arrive at the erase state, as represented by box 444.

If, alternatively, as determined in diamond 404, the state flag is determined to be normal, as represented by box 420, and an upgrade event is triggered, the state will be advanced to a card set up state, as represented by box 424. This corresponds to state/step 450 of FIG. 5A. The next state is the authentication state, as represented in box 428. The card will be assigned a role of either source or target while in this or the card set up state. If the authentication succeeded in step 460 of FIG. 5A, for example, the state will be updated to reflect that the device is in card upgrade mode/state, and the trusted ID (or serial number) of the card will be stored. The stored trusted ID is that of the other (source or target) card that participated in the original attempt to upgrade. The ensures that if there is an aborted upgrade, that when the process restarts that only the originally participating pair of cards, can participate. For example, a third card cannot act as a target and receive the data from the source. This ensures that at the end of the process that there will only be one copy of the data.

The next state is the copy acknowledge state (corresponding to step/phase 480 in FIG. 5A) as represented by box 436. Once the copy acknowledge is received, the device is transitioned to erase state, as represented by box 440, and the erase is acknowledged as a result as represented by box 444. The state is then advanced to a normal use state as represented by box 420. The device is therefore once again ready for normal usage.

Figures 1, 5C:
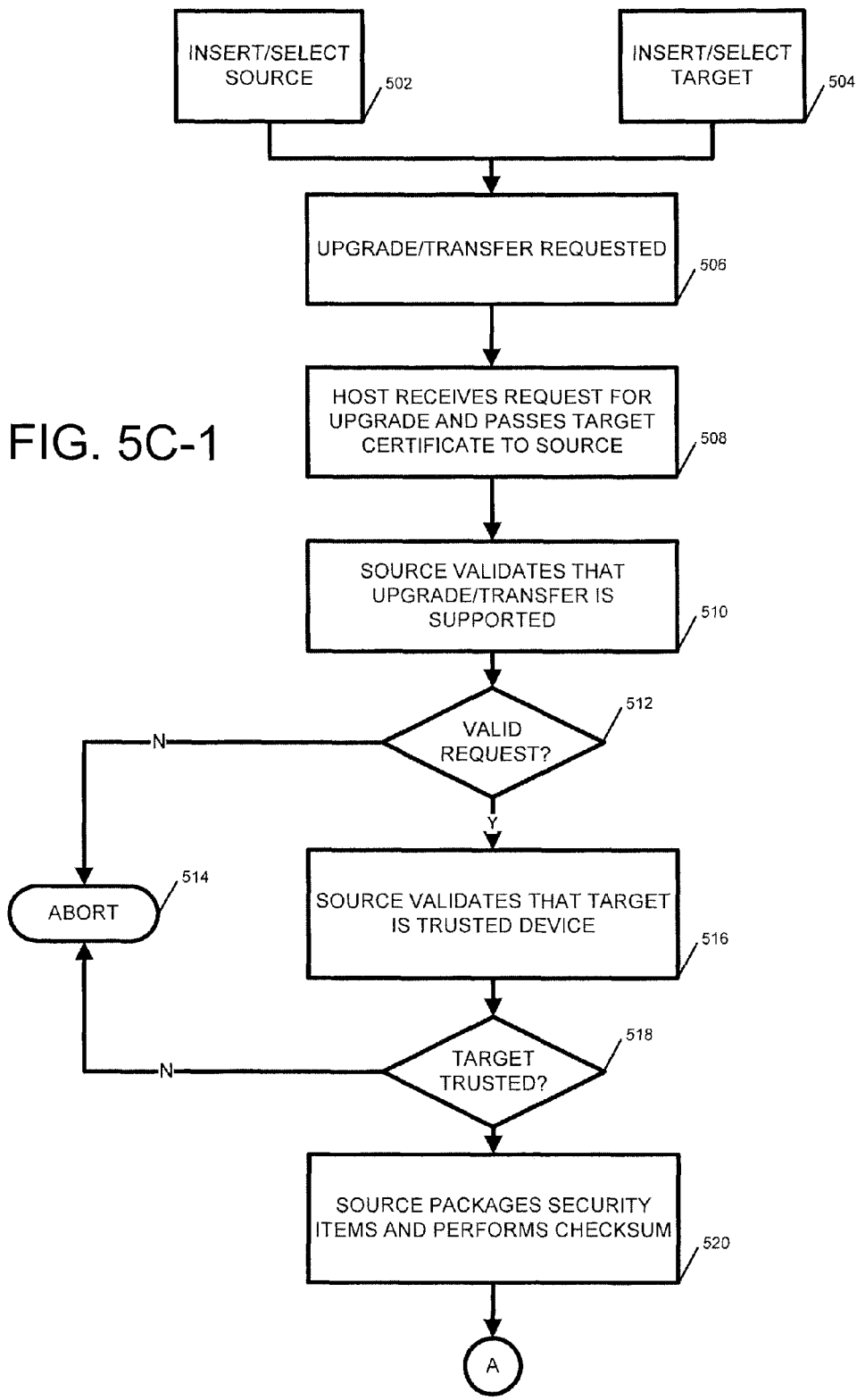
FIG. 5C is a flowchart illustrating an upgrade process according to an embodiment of the invention.
Figures 2, 5C:
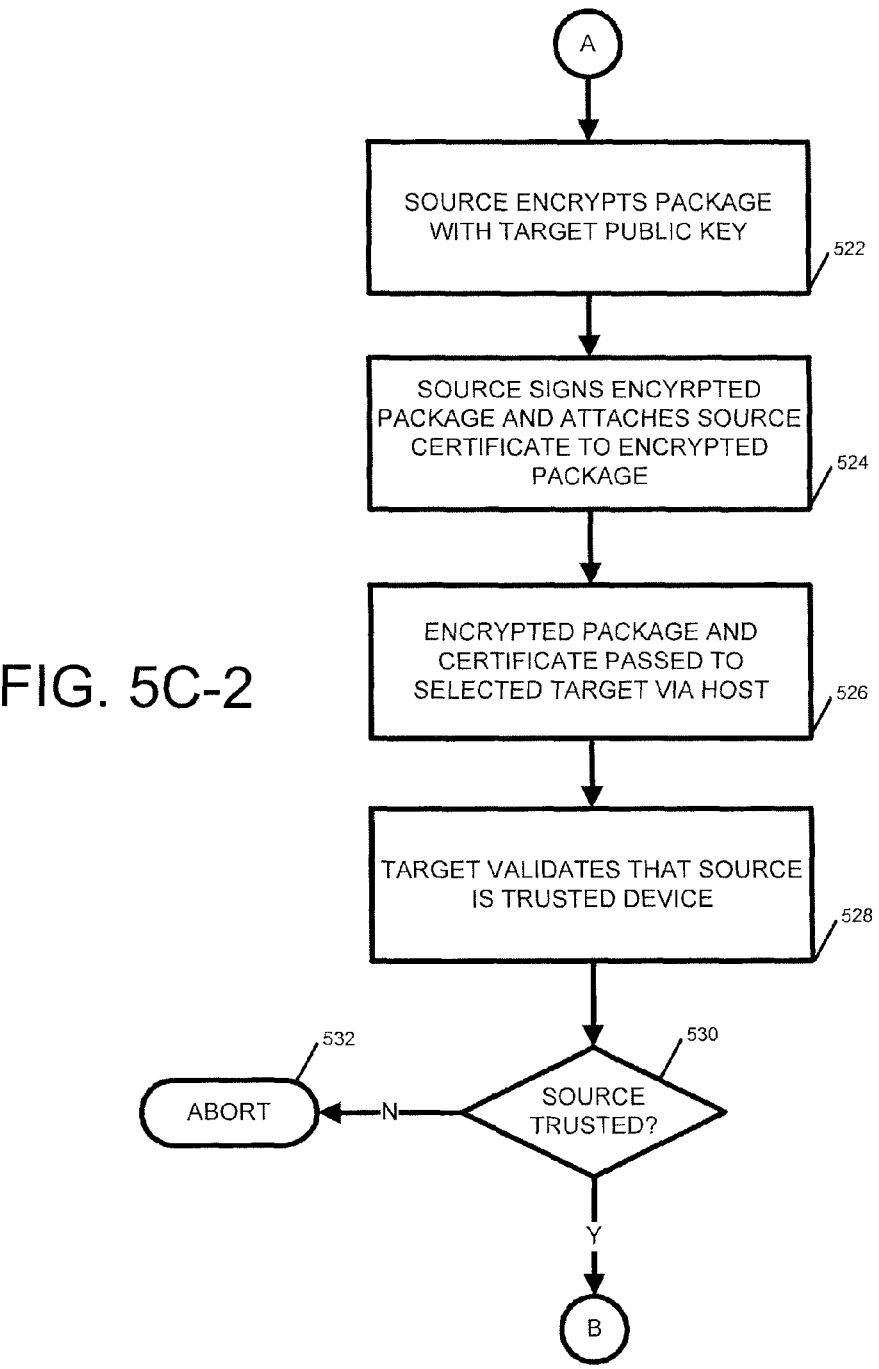
Figures 3, 5C:
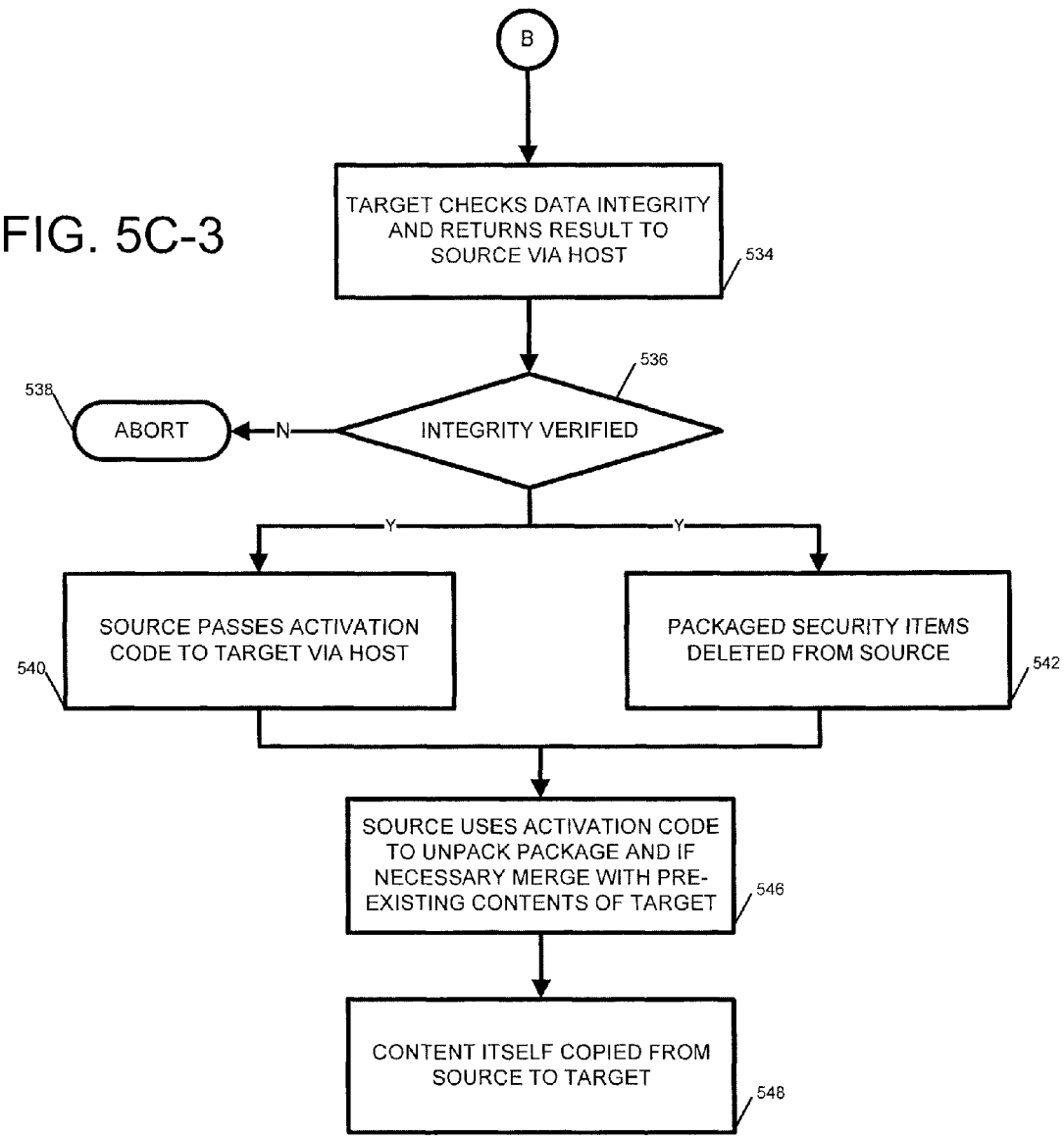

FIG. 5C is a flowchart illustrating a card upgrade process according to an embodiment of the present invention. As mentioned previously, the upgrade may take place sequentially, with data from the source stored for some period before being transferred to the target. In some embodiments where this is the case, and the source and target will not be in communication and a mutual session key will not be generated or used. In step 502, the source is inserted into a receptacle or otherwise selected if is has already been inserted. In step 504, which may occur well after the source card is inserted or selected and various of the following steps are performed, the target is inserted and/or selected. In step 506, an upgrade or transfer is requested. Next, as seen in step 508, the host receives the upgrade request and passes the target certificate to the source. The source then validates that the target is eligible to act as target and that it supports the upgrade. The target may have an equal or greater capacity as the source or alternatively sufficient capacity for the quantity of material to be moved, and have the same or higher level of security. Other criteria may also be necessary for the upgrade. If, as seen in step 512, the target and source are eligible for upgrade, the upgrade request is determined to be valid and the source then validates that the target is a trusted device. This is done, for example, by checking the certificate against a certificate authority. For example, a PKI certificate installed before or after the initial sale may be checked with a PKI certificate authority. If, however the request is not valid, the upgrade will be aborted, as represented by step 514. If the target is trusted, as determined in step 518, the source in step 520 packages the security items, which comprise at least soft keys 134 and may also comprise the system firmware 130, protected data 138, and secure applications 142. It may also optionally comprise some or all of the protected and/or unprotected content and diversification data, although such precautions are not typically necessary for the content. The source will then perform a checksum of the security package or alternatively cryptographically sign the package as part of step 520 before encrypting the package with the target public key in step 522. Calculating a checksum ensures the source card or the other entities that the target card correctly received the data that was transmitted. The checksum could also be used as part of a confirmation used to activate the data on the target card and disable the data on the source card.

In step 524, the source signs the encrypted package with its private key and attaches the source certificate to the encrypted package. A transaction ID may also be generated at this or some other point in the process. The transaction ID would preferably be generated by the target and would guard against a "replay attack" or a copy operation disguised as a move. This aids in assuring that the data can be transferred only once. In step 526, the encrypted package and certificate is passed to the selected target via the host or other proxy. Then in step 528, the target validates that the source is a trusted device, for example by checking with a PKI certificate authority. If in step 530, the source is not found to be a trusted one, the upgrade/transfer is aborted, as seen in step 532. If, alternatively, the source is trusted, the target then checks the data integrity and returns the result to the source via the host, in step 534. This check may involve comparing the checksum or the cryptographic signature from step 520. If the package integrity is not verified in step 536, the process will again be aborted as seen in step 538. If alternatively the integrity of the package is verified, the source will then pass an activation code to the target via the host in step 540, and the packaged security items will be deleted from the source in step 542. In step 546, the source uses the activation code to unpack the package and if necessary merge it with pre-exiting contents of the card. In step 548, the content of the card, in other words the protected and/or unprotected files in user partition 108C, are then copied from source to target. As the copy protected files that are encrypted are useless without the proper keys, they can be freely copied without the precautions provided for the secure package.

Figure 6:
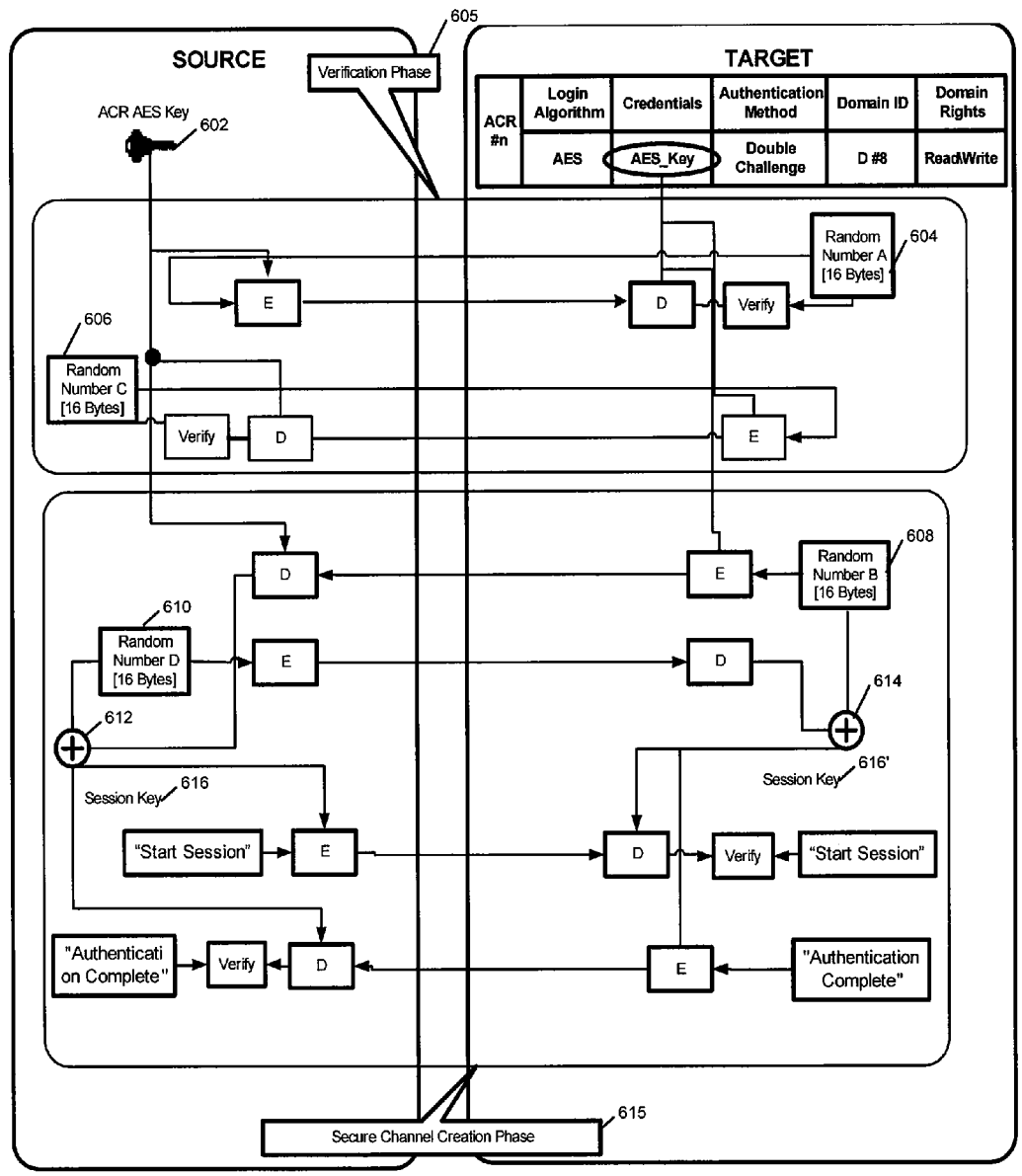
FIG. 6 is a diagram illustrating an authentication process according to an embodiment of the invention.

FIG. 6 illustrates an embodiment of an authentication technique for use with the upgrade process. Other authentication techniques known in the art may also be used, and the present invention should in no way be limited to this and previously described particular techniques. The technique in FIG. 6 technique creates a session key as a by product, which session key may be utilized as the session key described in relation to FIG. 4B.

FIG. 6 illustrates a double challenge method utilizing an AES key. The method comprises a verification phase 605, that comprises generating a first random number in an initiating one of the devices and passing it to a responding one of the devices, encrypting the first random number at the responding device, passing the first random number back in an encrypted form to the initiating device, and subsequently decrypting the encrypted first random number at the initiating device and comparing it to the number as generated. This can be seen with random number A, labeled 604. The method further comprises generating a second random number at the responding device and passing to the initiating device, encrypting it, and then passing it back to the responding device in an encrypted fashion, and comparing it to the number as generated. This can be seen with random number C, labeled 606 in FIG. 6.

A secure channel creation phase 615 is also illustrated in FIG. 6. Establishing the secure channel comprises generating a third random number at the initiating one of the devices, encrypting the third random number at the initiating device, passing the third random number to the responding device, decrypting it at the responding device, generating a fourth random number at the responding device, and performing an exclusive disjunction operation on the decrypted second random number and the third random number at the responding device. This can be seen with random number B, labeled 608, and random number D, labeled 610. The disjunction operations are labeled 612 and 614.

Once authentication is complete, the secure database described earlier and partition map may in some embodiments be encrypted based upon the result of the exclusive disjunction operation. This result is the session key 616 or 616'.

Although the various aspects of the present invention have been described with respect to exemplary embodiments thereof, it will be understood that the present invention is entitled to protection within the full scope of the appended claims.

What is claimed is:

1. A method of transferring protected data from a source flash storage drive to a target flash storage drive, the method comprising the source flash storage drive:

receiving a request to transfer contents of the source flash storage drive to the target flash storage drive, the source flash storage drive having a source hardware key, wherein the source hardware key uniquely identifies the source storage drive, the source hardware key being non-transferable and maintained in a controller of the source flash storage drive, and wherein the contents comprise operating firmware of the source flash storage drive bound to the source flash storage drive by the source hardware key;

authenticating the target flash storage drive; and if the target flash storage drive is authenticated:

unbinding the operating firmware from the source flash storage drive by decrypting the operating firmware of the source flash storage drive with the source hardware key;

establishing a secure session between the source and target flash storage drives and encrypting the decrypted operating firmware with a session key generated based on the authenticating of the target flash drive;

transferring the operating firmware encrypted with the session key during the secure session from the source flash storage drive to the target flash storage drive so that the target flash storage drive can then bind the transferred operating firmware to itself with a target hardware key which uniquely identifies the target flash storage drive; and deleting the operating firmware from the source flash storage drive upon receiving verification that the operating firmware has been successfully transferred from the source flash storage drive to the target flash storage drive.

2. The method of claim 1, wherein the contents of the source flash storage drive further include encrypted applications stored in a hidden partition of the source flash storage drive.

3. The method of claim 1, wherein the contents of the source flash storage drive further include user files encrypted with at least one of a group of software-based encryption keys in the source flash storage drive, and are freely accessible for copying by a host device in encrypted form.

4. The method of claim 1, further comprising encrypting a group of software based encryption keys stored in a system partition of the source flash storage drive with the source hardware key.

5. The method of claim 1, wherein during the transfer from the source flash storage drive to the target flash storage drive, transferring the contents to an intermediate storage unit other than the source or the target flash storage drive for temporary storage on route to the target flash storage drive.

6. The method of claim 1, further comprising encrypting a software application that runs on the source flash storage drive with one of a group of software-based encryption keys stored in the source flash storage drive.

7. The method of claim 6, further comprising the source flash storage drive:

storing the encrypted application in a flash memory of the source flash storage drive, the application having application specific security mechanisms independent of the source hardware key;

encrypting user files using the application specific security mechanisms of the encrypted application;

storing the user files that are protected with the application specific security mechanism in the flash memory of the source flash storage drive;

receiving, from time to time, a request from a file manager of a host device to access a user file; and accessing the user file when requested by:

with the operating firmware, correlating the file with the application used to access the file;

invoking the application specific security mechanisms of the application.

8. The method of claim 1, further comprising:

transferring a group of software-based encryption keys and an application from the source flash storage drive to the target flash storage drive, if the target flash storage drive is authenticated.

9. The method of claim 8, further comprising:

verifying that the operating firmware, the group of software based encryption keys, and the application have been transferred from the source flash storage drive to the target flash storage drive.

10. The method of claim 9, further comprising deleting user files from the source flash storage drive if the verification is successful.

11. The method of claim 4, wherein at least one of the group of software-based encryption keys is a function of information uniquely identifying the source flash storage drive.

12. The method of claim 7, wherein storing the user files that are protected with the application specific mechanism in the source flash storage drive further comprises utilizing one or more of the software-based encryption keys to encrypt one or more files in response to the request from an application programming interface.

13. The method of claim 7, wherein the application specific security mechanisms utilize diversification methods that are a function of information uniquely identifying the source flash storage drive.

14. The method of claim 13, wherein if an application relies on information specific to the source flash storage drive to authenticate with a remote server, and the application is transferred to a target flash storage drive, the information specific to the source flash storage drive for authentication is also transferred to the target flash storage drive.

15. A source flash storage drive for transferring normally non-transferable data from the source flash storage drive to a target flash storage drive, the source flash storage drive comprising:

a controller;

a group of software-based encryption keys;

a source hardware key uniquely associated with the source flash storage drive for a life of the source flash storage drive, the source hardware key being non-transferable and maintained in the controller;

a flash memory in communication with the controller; and wherein the controller is configured to:

receive a request to transfer contents of the source flash storage drive to the target flash storage drive, the contents comprising operating firmware of the source flash storage drive bound to the source flash storage drive by the source hardware key;

authenticate the target flash storage drive; and if the target flash storage drive is authenticated:

unbind the operating firmware from the source flash storage drive by decrypting the operating firmware of the source flash storage drive with the source hardware key;

establish a secure session between the source flash storage drive and the target flash storage drive and encrypt the decrypted operating firmware with a session key generated based on the authentication of the target flash storage drive;

transfer the operating firmware encrypted with the session key during the secure session from the source flash storage drive to the target flash storage drive so that the target flash storage drive can then bind the transferred operating firmware to itself with a target flash storage drive hardware key; and delete the operating firmware from the source flash storage drive upon receiving verification that the operating firmware has been successfully transferred from the source flash storage drive to the target flash storage drive.

16. The source flash storage drive of claim 15, wherein the contents further include applications, and wherein the applications are encrypted applications stored in a hidden partition of the source flash storage drive.

17. The source flash storage drive of claim 15, wherein the contents further include user-files stored in the source flash storage drive, and wherein the user files are encrypted with at least one of the group of software-based encryption keys and are freely accessible for copying by a host device in encrypted form.

18. The source flash storage drive of claim 15, wherein the controller is further configured to encrypt the group of software based encryption keys with the source hardware key.

* * * * *